Dec. 3, 1968  A. H. WEIERTZ  3,414,287

STEERING AND STABILIZING FRONT WHEEL SUSPENSION FOR MOTOR CARS

Filed May 16, 1966

Inventor
Axel H. Weiertz
By
Wenderoth, Lind & Ponack
Attorneys

United States Patent Office 3,414,287
Patented Dec. 3, 1968

3,414,287
STEERING AND STABILIZING FRONT WHEEL SUSPENSION FOR MOTOR CARS
Axel Hugo Weiertz, Bellevuevagen 24, Malmo, Sweden
Filed May 16, 1966, Ser. No. 550,378
5 Claims. (Cl. 280—96.2)

ABSTRACT OF THE DISCLOSURE

The steerable wheels of an automobile have between an arm directed rearwardly from each steering knuckle, and the frame a strut transmitting to the knuckle from the frame a force depending on the weight and momentum of the frame and the load carried thereby.

---

This invention relates to a stabilizing suspension for a pair of steerable road wheels of automobiles. The stabilizer according to the invention is of the type including between each wheel support and the automobile frame structure means for producing a force between said frame structure and said wheel support counteracting external forces acting on the wheel and transmitted therefrom to the wheel support.

Among the accidents now increasingly occurring on the roads there are such as are never fully explainable even to the police and the automotive experts who investigate the circumstances resulting in the accident. Accidents of this type are those in which a car on a straight and apparently smooth road when moving at high though not extremely high speed suddenly deviates from its straight forward course and turns to the other side of the road hitting a car coming from the opposite direction, or runs off the road hitting obstacles in the surroundings. In such cases severe crashes arise and the persons riding in the car or cars are killed or seriously injured. Accidents of this kind generally are "explained" by experts to be due to the human factor, the driver fell asleep or without reason suddenly changed his course, or to a non-realized technical fault in the car though no evidence is put forth to sustain such explanations.

I submit that the fatal accidents related above where a car gets out of control and smashes into another car, a tree etc. to a substantial extent are due to an inherent insufficiency in the construction of the steering system of modern motor cars that has not been taken into consideration by the car designers. Below I will explain this assertion more in detail.

Unevenness of the road surface and also varying friction coefficients of the road surface at different sections thereof may cause the front wheels of a car, controlled by the steering mechanism, to flutter or turn by impulses from the road. Having noticed these undesirable angular movements of the front wheels of a car, I have studied the front wheel geometry in order to find out the reason why the excessive angular movements of the front wheels occur under certain circumstances beyond the control of the driver and I have found that the value of the lead of the front wheels is a major factor affecting the stability of the front wheels when the motor car is running at reasonably high and very high speeds. In modern cars having independently suspended front wheels there is provided no or very small lead of positive or even zero or small negative caster angles. However, it is established in the art that great lead makes the steering of the car more distinct but also heavier, at the same time making the car more sensitive to sudden lateral wind gusts. On the other hand, a small lead provides an easier steering of the car and better stability with regard to wind gusts but makes the front wheels more sensitive to unevennesses of the road surface, which leads to the fluttering and the externally initiated angular movements of the front wheels as recited above. However, in modern motor cars the angular movements of the front road wheels thus caused are prevented from reaching the steering wheel by the provision of elastically yielding connections such as rubber bushings. The more comfortable driving thereby achieved by the modern design of the steering mechanism of modern motor cars therefore is a chimera giving the driver the feeling of safe driving and keeping him unaware of the uncontrolled movements effected by the front wheels though not transmitted to him.

Now, the matter of steering control is contingent upon the road wheels maintaining a close and intimate contact with the road surface. Such intimate contact may be disturbed by unevenness of the road, protuberances and cavities in the road surface causing the road wheels at least partly to lose their friction engagement with the road surface. This is especially true in winter when the roads are in a slippery state decreasing the road wheel friction engagement with the road surface to an extremely low value. This means that also the undesirable uncontrolled angular movements of the front wheels decrease the friction engagement between the road wheels and the road surface, but in general the road friction will not be sufficiently low to permit the car to get out of control. However, in my opinion this will be the case under specific circumstances and will lead to an extremely dangerous driving condition. If e.g. both front wheels simultaneously strike against protuberances, even small ones, in the road surface, something that is likely to occur even on the modern roads having a smooth hard surface, both front wheels may be caused to turn due to the sudden shock at both wheels causing them to lose their friction engagement with the road surface necessary to keep the car under the driver's control by the movements transmitted to the road wheels through the steering mechanism. Also, if in winter one wheel is running into a rough strip of frozen ice-slush usually appearing at the edge or border of the road, the other front wheel still being on a smooth but slippery part of the road, the total friction between the front wheels and the road surface may suddenly be so low that the car gets out of control without any possibility for the driver to overcome the uncontrolled condition of the car. Therefore, I maintain that the apparently comfortable, but actually unsafe and dangerous condition at reasonably high and very high speeds as recited above is the reason for the accidents where the car suddenly and unexpectedly gets out of control and that such condition is inherently connected with most modern cars due to the constructive features included herein and considered customary in the art. No uncontrolled movements of the road wheels are felt by the driver through the steering system as they are absorbed by the yieldable elements incorporated in such system but such movements are still at the wheels and may reach such magnitude as results in an uncontrolled movement of the car which suddenly occurs to the driver giving him no possibility of getting the car under control before it is too late and an accident happens.

The main object of the invention is to provide a steering and stabilizing front wheel suspension for motor cars removing the deficiencies of the steering mechanisms now commonly used.

Another object of the invention is to provide a stabilizing means using the momentum of the motor car to stabilize the steerable front road wheels when the car is moving straight ahead.

A further object of the invention is to provide a stabilizing means providing steering aid when the car moves through curves by the centrifugal force acting on the car when changing its direction.

For better elucidation, these and other features of the invention and the advantages gained thereby will be described more in detail in the follownig, reference being had to the accompanying drawings in which.

Figure 1:
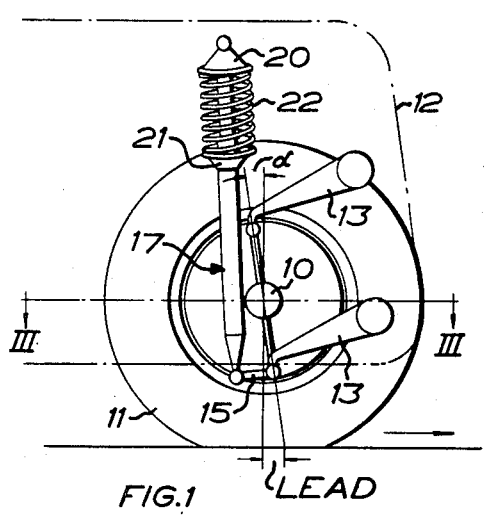
FIG. 1 is a schematic side elevational view of one individually hung steerable front wheel of an automobile, as seen from a central longitudinally vertical plane through the automobile, the stabilizer according to the invention being provided for said front wheel.

The automobile on each side has a steering knuckle 10 with a wheel 11 journaled thereon which is connected to the chassis frame 12 of the automobile by means of upper and lower control arms 13 pivoted on transverse axes. The automobile road wheels are steerable by means of a conventional mechanical steering mechanism which includes a steering link 14 and a steering link arm 15 provided on the steering knuckle 10, said steering link 14 being connected to the conventional steering gear controlled by the steering wheel.

Arranged in accordance with the invention between a stationary abutment 16 and steering link arm 15 on each side of the car is a spring biased strut 17 incorporating also double acting shock absorbing features. Strut 17 is connected with abutment 16 and arm 15 by ball joints or other universal joints the connecting point on arm 15 being disposed inwardly of the connection point thereon of link 14. In a manner known per se strut 17 includes two telescopically arranged tubular elements 18 and 19 each being provided with a cup-shaped circumferential outer flange 20 and 21, respectively, and a coil spring 22 surrounding element 18 and abutting said flanges 20 and 21 at its ends. Thus, elements 18 and 19 may be pushed together more or less against the force of spring 22. As mentioned, strut 17 also forms a shock absorber, element 18 being provided with a restricted opening in an end wall at the inner end thereof allowing controlled passage of hydraulic fluid contained in said elements 18 and 19 from one side of end wall to the other side of such wall from the interior of one element to the interior of the other element, and vice versa. As is appreciated the special form of the shock absorbing feature constitutes no part of the present invention as other shock absorber constructions may be suitable for use in the strut provided according to the invention.

Considering now the steering geometry of the front wheel suspension shown in the drawing and described above it will be noted that each front wheel has a caster angle α setting up a lead since the vertical center line of the wheel is placed behind the center line of the pivot or king pin of the knuckle as shown in FIG. 1. It is known that a caster angle providing great lead will make the steering of the car heavy to the driver but on the other hand such great lead will make the running of the car more stable without tendency of the car to drive violently from one side to the other. Such driving may be minimized or even eliminated by the specific design of the front wheel suspension according to the invention.

Figure 2:
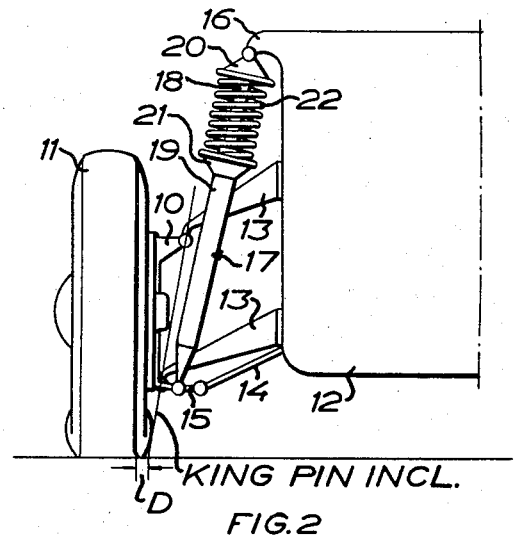
FIG. 2 is a schematic view of the arrangement of FIG. 1, as seen from the driver's seat.
Figure 3:
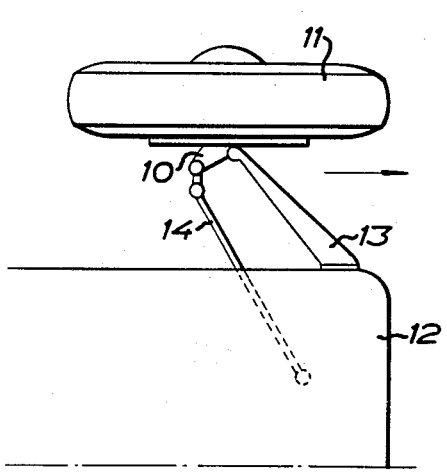
FIG. 3 is a plan view of the mechanism in FIG. 1 along line III—III therein, the stabilizer being omitted therefrom.
Figure 4:
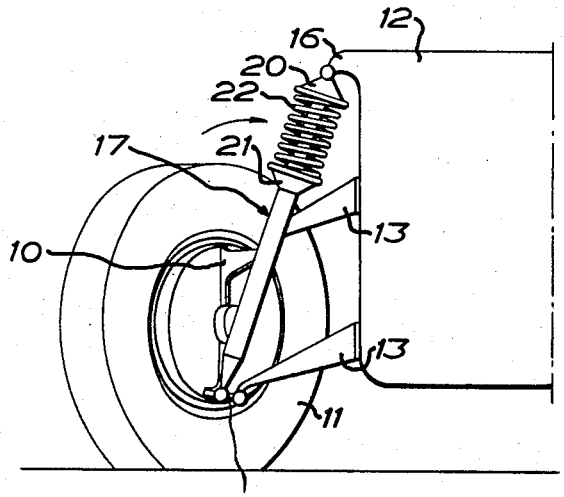
FIG. 4 is a view similar to FIG. 2 in which the wheels are turned to drive the car to the right.

The king pin inclination is illustrated by FIG. 2 in the drawings and it is noted that the king pin inclination in the steering mechanism disclosed herein places the turning point not at the center of the tire tread as usually is the case but instead inside the wheel and, in fact, at a distance D therefrom. Such king pin inclination no doubt makes the steering less stable than a king pin inclination placing the turning point at the center of the tire tread, as there is a tendency of the wheel to swing around the king pin when it strikes a bump. Again, this undesirable tendency is eliminated by the specific steering geometry and front wheel suspension proposed according to the invention. In this connection it should be noted that a greater distance between the turning point of the front wheel and the center of the tire provides an easier turning of the wheels when the car is at rest.

Considering the front wheel suspension of the invention it is noted that the weight of the car is transmitted to the front wheels by struts 17 only which means that such weight is acting on steering arm 15. Now, each strut 17 is inclined to the vertical and according to the invention it should be arranged parallel to the king pin or at a greater angle to the vertical than the kin pin in order that a steering force may be transmitted to the steering knuckle. As is appreciated, when the front wheels are in a position for straight forward movement of the car no force is applied to the front wheels to cause them to turn as the forces from struts 17 on both sides of the car neutralize each other. The risk for sudden great uncontrolled turning of the wheels on account of external forces acting thereon e.g. caused by bumps in the road may be minimized or even eliminated by the possibility to choose a great lead. Further, fluttering of the wheels is spontaneously absorbed directly at the wheels by the shock absorbing struts without possibility to be transmitted to the steering gear, making the driving comfortable to the driver. Struts 17 also give steering aid when the car passes through turns. In a curve one of the struts viz. the strut on the outer side of the curve is heavier loaded with the weight of the car than the other strut on the other side on account of the centrifugal force and thus there is provided on the outer steering knuckle a force that assists the steering force, the force provided by the strut on the steering knuckle on the other side of the car at the same time being partially relieved. Thus, it is compensated for the heavier steering provided by the greater lead by the steering aid achieved by the struts. The transverse distance between the ball joints on abutments 16 should be less than the transverse distance between the ball joints of the struts on steering arms 15 (in general this is the case on account of the king pin inclination) to obtain automatically the greater force that is necessary to turn the wheels the narrower the curve is. This depends on the fact that the inclination of the strut 17 will change with the turning of the wheels to a position including a greater angle to the vertical. Thus, the force applied by the strut will have a greater horizontal component for a greater wheel angle than for a smaller one.

It is appreciated that the steering geometry of the front wheel suspension according to the invention is dependent on the particular car in which the invention is used, no numeric values therefore can be given for the designer's guidance. However, the invention is not limited to specific numeric values or even ranges of values but is concerned with the novel arrangement of the strut 17 transmitting the weight of the car directly to the steerable front wheels and stabilizing the movements of such wheels when driving the car straight ahead or through curves. Therefore, it is appreciated that the invention is not limited by the embodiment described but may be modified without departing from the spirit of the invention within the scope of the appended claims.

What I claim and desire to secure by Letters Patent is:

1. In an automobile having a frame structure, a pair of steerable wheels, a wheel support on said frame structure for each of said wheels, each of said wheel supports including a steering knuckle pivoted to the frame structure, the combination comprising an arm on each steering knuckle rigidly projecting rearwardly therefrom, a steering control means operatively connected to each said arm, means between said frame structure and said arm for transmitting to said steering knuckle the weight of said frame structure and the load supported thereby as a variable force actuating the steering of said wheels in dependence on the momentum of said frame structure and the load thereon.

2. The combination as claimed in claim 1 in which said means comprises an elastically yieldable strut universally connected at its ends to said frame structure and said arm.

3. The combination as claimed in claim 2 in which said strut comprises shock absorbing means.

4. The combination as claimed in claim 2 in which said strut is inclined to the vertical at an angle which is at least as great as an angle of inclination to the vertical of the pivot axis of said knuckle.

5. The combination as claimed in claim 4 in which the inclination of the pivot axis of said knuckle defines a turning point of each of said wheels which is disposed inside the wheel.

References Cited

UNITED STATES PATENTS

| 2,065,071 | 12/1936 | Harris | 280—96.2 |
| 2,154,569 | 4/1939 | Hicks | 280—124 |
| 2,775,467 | 12/1956 | Kraus et al. | 280—124 |
| 2,846,234 | 8/1958 | Steinkamp et al. | 280—124 |
| 3,202,237 | 8/1965 | Dreisziger | 280—124 |

BENJAMIN HERSH, *Primary Examiner.*

L. D. MORRIS, Jr., *Assistant Examiner.*